INVENTOR
JEAN-PIERRE CAILLEY
BY
ATTORNEYS

INVENTOR
JEAN-PIERRE CAILLEY

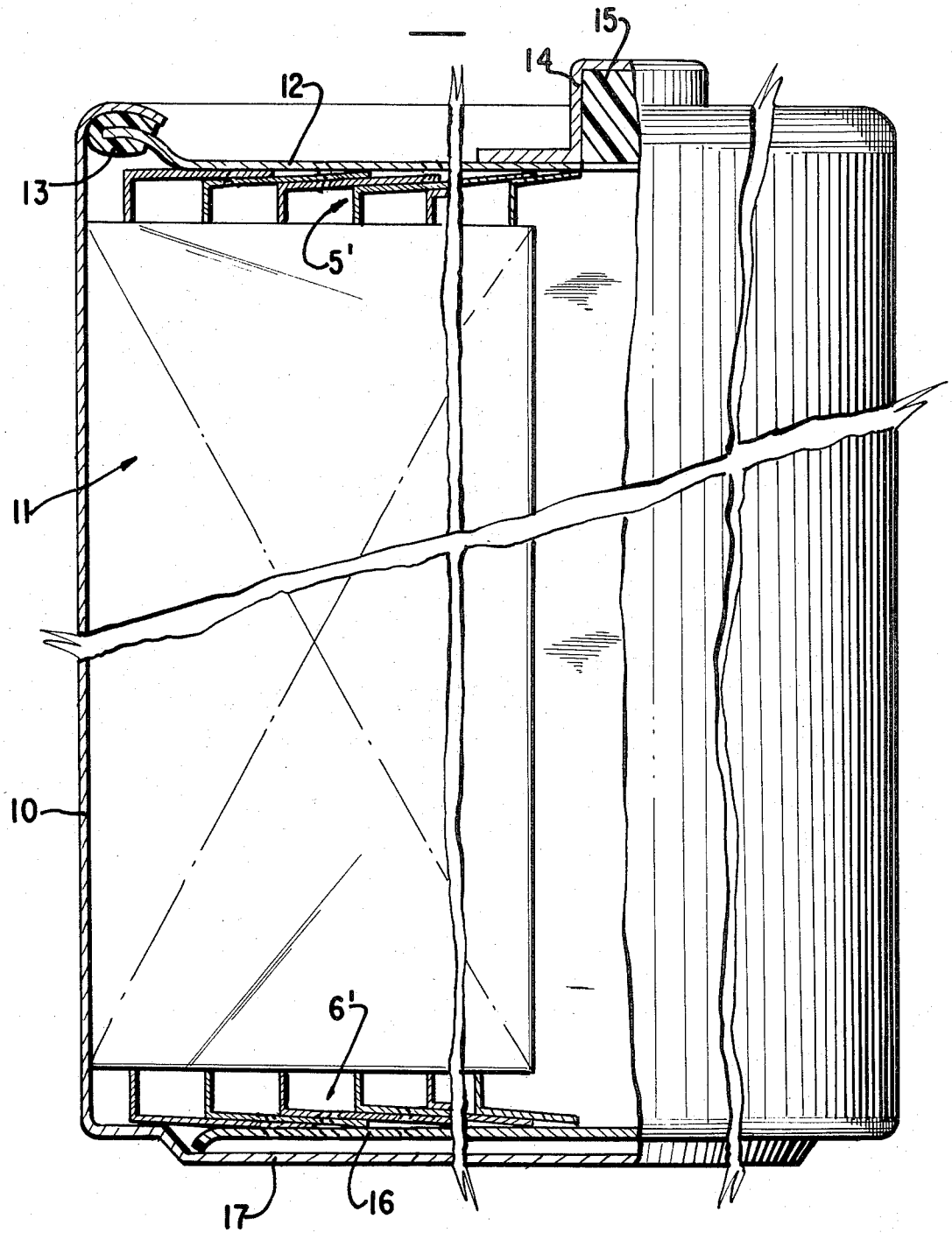

United States Patent Office 3,761,314
Patented Sept. 25, 1973

3,761,314
HIGH DISCHARGE RATE ELECTRIC CELLS
AND BATTERIES
Jean-Pierre Cailley, Ambares, France, assignor to Societe
des Accumulateurs Fixes et de Traction (Societe
Anonyme), Romanville, France
Filed June 22, 1971, Ser. No. 155,534
Claims priority, application France, June 23, 1970,
7023184
Int. Cl. H01m 35/16
U.S. Cl. 136—13
10 Claims

ABSTRACT OF THE DISCLOSURE

High discharge rate electric cells in which an assembly of opposite polarity electrodes and separators in wound form are provided. The opposite polarity electrodes have bared conductive edge portions of their carriers which project respectively from opposite ends of the assembly. These respective projecting edge portions are slotted and folded down at the opposite ends substantially perpendicular to the surfaces of the electrodes. The projecting edge portions are of sufficient width so that when folded they extend over a distance greater than the distance between two adjacent spires of the same wound electrode. The adjacent segments of the conductive edge portions defined by the slots therein partially overlap laterally so as to form at the respective ends of the assembly a substantially plane elastically deformable surface for electrical contact with a current collector which latter may be welded at selected localities thereto, one of said collectors being the bottom of the metallic casing and the other being a metallic cover insulated from the casing and sealingly joined thereto.

BACKGROUND AND SUMMARY OF INVENTION

The invention concerns electric cells, more particularly of the high discharge rate type, and more especially those provided with an assembly of wound electrodes and separators.

It is already known that electric cells, and more particularly alkaline storage cells having thin sintered electrodes separated by a narrow gap, are capable of yielding high discharge rates. This enables them to be used when a power source of small dimensions and capable of supplying high power is needed. In the case of cylindrical storage cells, the problem of adequate current collectors for the electrodes becomes very acute. It is quite evident that it is necessary to have connections to the electrodes which can conduct the high currents which the assembly of electrodes and separators is capable of supplying. For this purpose, the current collectors must be provided for contact with the greatest possible length of the respective electrodes, thus making it possible to obtain a very high uniformity of operating potential on the whole length of the electrodes.

In the art, a French patent, 1,415,519, filed on 18th of July, 1963, disclosed a process for welding collector plates on the protruding thin edges of the respective electrode carriers, which were either stacked or wound in an assembly, the electrodes of opposite polarity being staggered so that the edges of the carrier of electrodes of one polarity projected at one end and those of the other polarity projected at the other end of the assembly.

Other prior patents disclose similar solutions which enable the electrodes to be in contact with the current collectors through their edges, over a great part of the lengths of the electrodes.

The main disadvantage of this type of connection of the current collector to an electrode edge is the insecurity of the welds since the rim of an electrode carrier which is but a few hundredths, or at the most, tenths of a millimetre thick, is in abutment with a substantially perpendicular metal surface of the current collector when the weld is effected. Moreover, there are difficulties actually inherent to the welding operations. Consequently, the welds between their rims and the collector surface are not very reliable.

The present invention aims more particularly at overcoming this disadvtange and is intended to provide a solution which enables reliable welds to be made between two relatively large contacting areas capable of bearing high pressures during welding, or, even, due to the dimensions of these contacting areas, making it possible to do without welds altogether for reliable contact between the current collectors and the electrode carriers.

Objects and features of the invention are the provision of an electric cell, more particularly of the high discharge rate type, provided with an assembly of wound electrodes and separators, in which an electrode of one polarity and an electrode of opposite polarity project respectively at opposite ends of the assembly by conductive longitudinal edge parts of the respective electrodes, preferably, constituted by the metal carriers of the said electrodes, the said projecting edge parts being respectively in large areal contact, at each end of the assembly, with a current collector, the said cell being characterized in that the respective conductive projecting carrier edge parts of the electrodes are provided with transverse slots to provide segments. These segments after winding are folded down in a substantially perpendicular direction to the electrode surface to span a length greater than the distance or space separating two adjacent spires of the same electrode. The adjacent segments of the said conductive parts, defined by the slots in their folded-over condition partly overlap laterally so as to form, on respective ends of the said assembly a supporting surface which is substantially plane and elastically deformable, for effective contact with a current collector.

Such an elastically deformable supporting surface which in itself is capable of insuring a good electrical contact, with a current collector could not be obtained by separated strips which overlap only radially and not laterally.

According to an embodiment of the invention, at least one of the current collectors can be welded to one of the supporting areas thus created.

According to another embodiment, at least one of the current collectors can be maintained under presure against such of said supporting areas.

In this event, the current collector, which can be in the shape of a plate, could, for example, be held in position by crimping the edge of the casing containing the assembly of electrodes and separators over its peripheral edge.

According to another characteristic of the invention, the current collectors can themselves be constituted respectively by the cell cover or the bottom of the casing containing the assembly of electrodes and separators.

DRAWINGS

Other objects, features and characteristics of the invention will become apparent from the following detailed description and from the annexed drawings forming a part hereof, wherein:

FIG. 1 diagrammatically shows a partial sectional elevational view of an assembly of wound electrodes and separators for a cell according to the invention;

Figure 5:
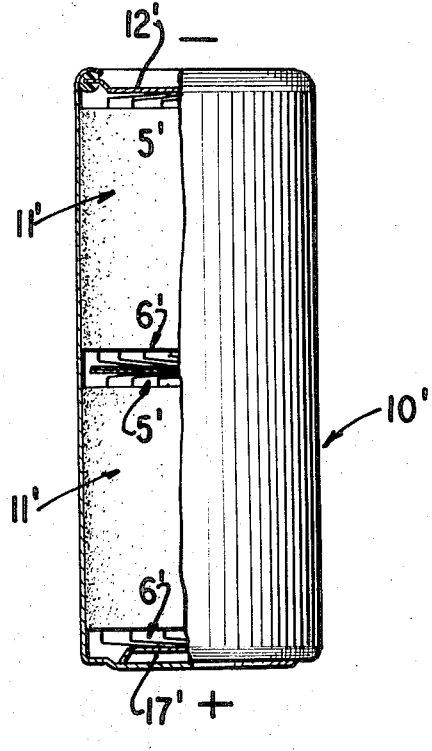
Figure 6:
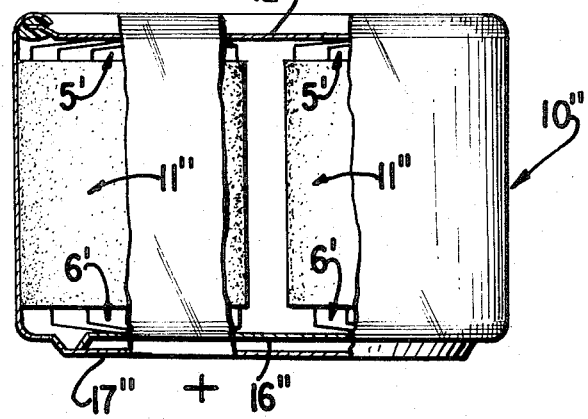

FIG. 4 diagrammatically shows a vertical sectional view of an electric cell or generator embodying the invention;

FIG. 5 is a diagrammatic section of a battery of series connected cells embodying the invention, and FIG. 6 is a diagrammatic section of a battery of parallel connected cells embodying the invention.

DETAILED DESCRIPTION

Figure 1:
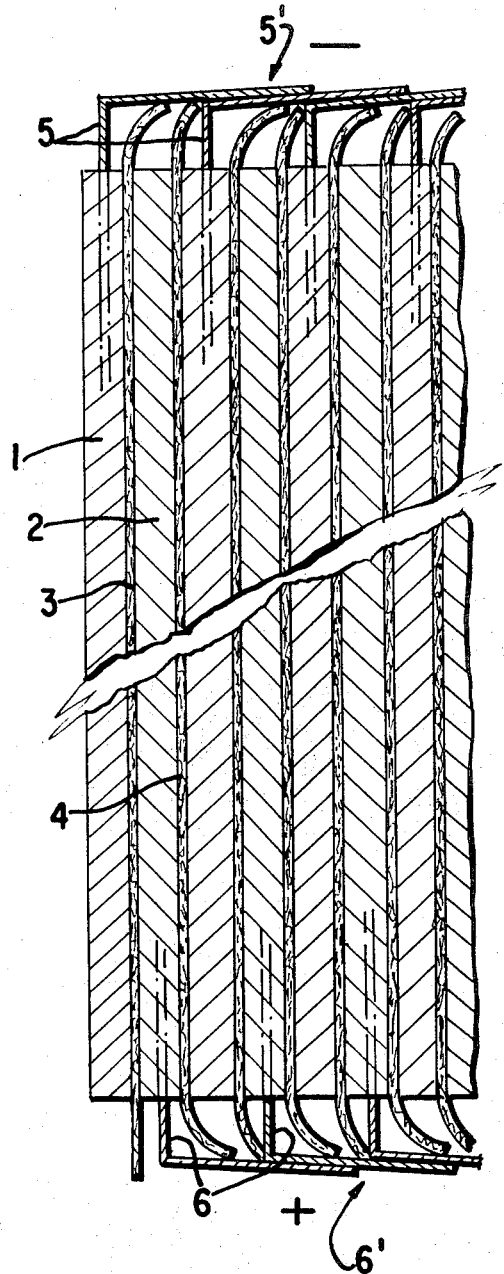

Referring to the drawings, FIG. 1 diagrammatically shows an assembly of electrodes and separators obtained by winding a group of superposed negative positive electrodes and two separator strips. The electrodes 1 and 2 each comprise a metal carrier sheet carrying on both faces, the respective negative and positive active materials. For each electrode 1 or 2, a longitudinal edge part of the metal carrier sheet is left bare. The respective electrodes 1 and 2 and separators 3 and 4 are then assembled in such a way that the bare edge part of one electrode projects at one end of the assembly obtained after winding of the electrodes and separators and the bare edge part of the other electrode projects on the other end of the said wound assembly.

The metal carrier sheet of the negative electrode 1 is designated by reference 5 and that of the positive electrode is designated by reference 6. The edge-parts of the respective carriers that are not covered by active material are slotted and turned down in a substantially perpendicular direction to the surfaces of the respective electrodes, the widths of the turned-down parts being greater than the distance separating two adjacent spires of the same electrode in its wound condition and preferably about twice that distance. In this manner, the turned-down edge part corresponding to one spire overlies the turned-down part of at least the adjacent spire of said wound electrode. Moreover, the adjacent segments of the said edge part defined by the slots partly overlap laterally. Thus, the turned-down segments of the edge parts for insubstantially plane and elastically deformable supporting surface areas.

The supporting area formed by the turned-down segments of edge parts of the negative electrode carrier is designated by reference 5' and that formed by the turned-down segments of edge parts of the positive electrode carrier is designated by refernece 6'.

The segments of the edge parts of the carrier are turned-down at a slight distance from the active material thereon; this distance can be about one millimetre, for example.

Figure 2:
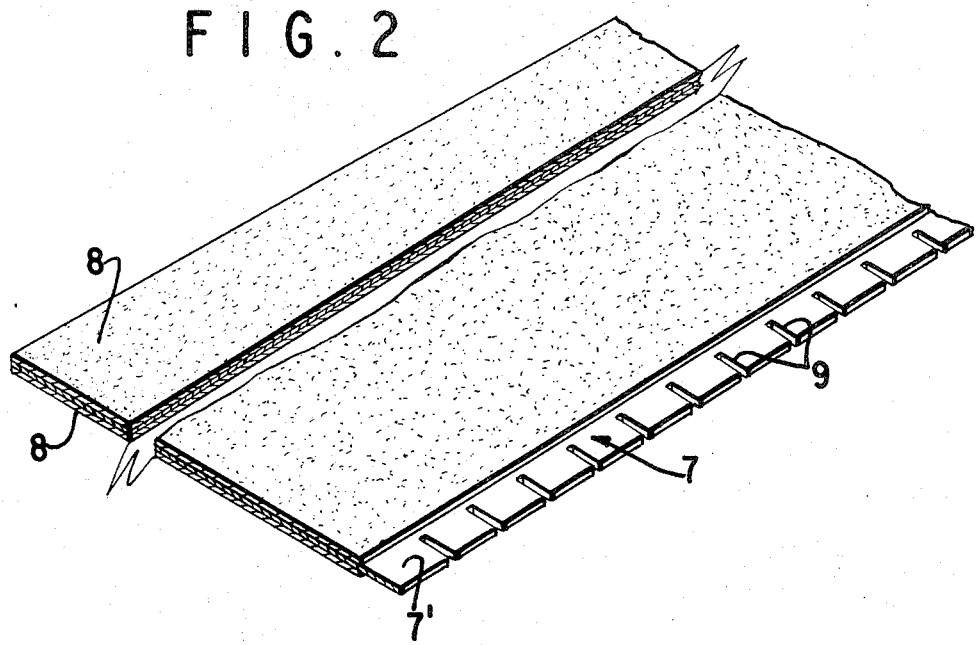
FIG. 2 is a perspective view of a portion of an electrode used in preparing the assembly shown in FIG. 1.

FIG. 2 shows a perspective view of a part of either a positive or a negative electrode, used to make up the assembly shown in FIG. 1. The metal carrier sheet for the active material is designated by reference 7, the active material being designated by reference 8.

In the example shown, the width of the bare longitudinal edge part 7' of the mettal carrier 7 not covered by active material is about 3.5 mm. The carrier 7 has transverse slots 9 in its said longitudinal edge part 7' which facilitate the turning down of the edge part 7', the slots being spaced, for example, by about 4 mm. They extend laterally from the periphery of the edge part 7' to about 1 mm. from the active material 8 on the carrier 7. These slots divide said edge part 7' into adjacent like bare segments.

The thickness of each electrode in the portion bearing the active material is 0.6 to 0.7 mm. The spacing between two consecutive spires of one carrier sheet is about 1.7 mm.

Figure 3:
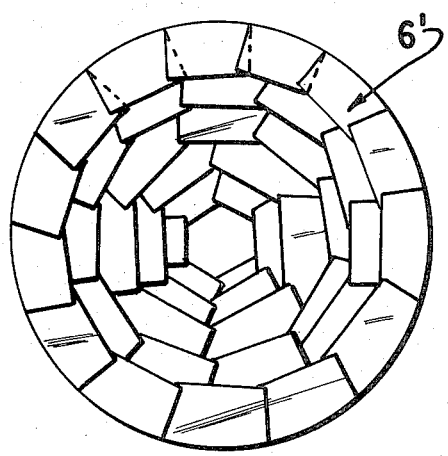
FIG. 3 is a plan view of one end of the assembly shown in FIG. 1.

During the winding of the electrodes, each bare segment in spaces of the electrodes defined by two adjacent slots is turned down onto the one preceding it. Thus, a winding assembly whose opposite ends resemble fish scales is produced. These fish scales produced by the overlapping segments cover the whole surface of the respective ends with the exception of the central hole, as is seen clearly in FIG. 3 which depicts a plan view of one of the ends of the wound assembly, for example, the end providing the supporting fish scale-like surface 6'.

As the scales provided by the segments overlap, and as in some cases, as many as three or four segments can thus be superimposed, the supporting scale-like surface thus formed has a degree of elasticity combined with very great strength. This elasticity is further enhanced by the fact that since the longitudinal edges of the separators also project from ends of the wound assembly, they are also turned down when the segments forming scale are turned down, and can then individually be more or less inserted between two consecutive scale-forming segments. Then a pressure of about 30 to 40 kg. per sq. cm. can, for example, be applied to the scale-like surface 6' without practically causing any permanent deformation thereof.

A current collector for each of the electrodes can be directly welded onto the respective supporting areal surface 5' and 6'.

The welding operation, which is then effected between two substantially plane surfaces pressed together during welding, no longer gives rise to any difficulty, and the welds thus formed are very reliable.

Moreover, because of the elasticity of the supporting areal surfaces, it is then possible to obtain an excellent electrical contact between the current collectors and those supporting areas by simply maintaining the said collectors pressed onto these surfaces, without any need for welding.

It is possible, too, in order to improve the electric contacts, to weld the lapping scale-like segments together before positioning the current collector. Moreover, and optionally, at their regions of overlap bosses could be provided on the surface of the respective collectors to be welded to the supporting areal surfaces so as to facilitate their welding to the scale-like segments as by capacitor discharge during manufacture.

In that embodiment wherein a collector is held in pressed condition against the supporting areal surface, the said collector can be maintained in such condition by crimping the open edge of the casing containing the assembly of electrodes and separators over its peripheral edge. As has previously been said, the collectors can be constituted respectively by the cover or the bottom of the casing containing the wound assembly of electrodes and separators.

FIG. 4 diagrammatically shows a sectional view of a storage cell according to the invention.

In this figure, the cover of the casing constitutes one of the current collectors.

The metal casing of the cell is designated by reference 10. The wound assembly of electrodes and separators as shown in FIG. 1 has been diagrammatically included and is designated by reference 11. The casing metal cover, for example, made of nickel-plated steel, is designated by reference 12. This cover, which forms the negative current collector is held in position, pressed against the scale-like surfaces 5' by crimping the open upper edge of the casing 10 over the peripheral edge of said cover 12, a seal washer 13 of insulating material being positioned between the respective edges of the casing and cover during crimping. In order to effect a good electrical contact between the cover 12 and the surface 5', a pressure of about 30 to 40 kg. per sq. cm. is applied to the cover 12 during the crimping operation. A conventional valve seat for the storage cell is provided, being designated by reference 14, the diagrammatically shown conventional valve being designated by reference 15. The positive current collector is constituted by a slightly cambered plate 16 bearing with pressure, on the one hand, on the positive supporting surface 6', and on the other hand, on the bottom 17 of the casing 10. This pressure is achieved by the pressure applied during the crimping operation of cover and casing.

One great advantage of the illustrated embodiment in which the negative current collector is constituted by the cover 12 of the cell casing 10 is that it saves space inside the said casing for the assembly formed by the wound electrodes and separators, due to the fact that the same part (cover 12) fulfills the functions which formerly required two distinct components.

Moreover, in previously produced cells, it was necessary to provide a groove at the upper part of the housing, intended for supporting the cover of the housing since the ends of assembly of electrodes and separators did not have sufficient strength to withstand the crimpinng operation on the cover. This arrangement can be eliminated to great advantage in the cell according to the invention, due to the present high mechanical strength of the scale-like ends of the wound assembly of electrodes and separators. The result is the possibility of saving extra space for the said assembly.

Cells according to the invention can, therefore, have improved capacity per unit of volume as compared to presently existing cells of the same bulk.

The application of the invention enables cells of greater size and greater capacity to be produced to great advantage by parallel connecting several wound assemblies of electrodes and separators inside the same casing.

A group of wound assemblies 11″ can be arranged in electrical parallel to each other in a common casing 10″ as shown in FIG. 6, the supporting areas 5′ and 6′ corresponding to one polarity being all in contact with the same respective collector current 12″ and 16″ and possibly welded to the latter.

For series connection of wound assemblies 11′ as seen in FIG. 5, they can be suitably stacked in a common casing 10′ and preferably welded together at their adjoining opposite polarity supporting areas 5′ and 6′ the outermost respective supporting areas 5′ and 6′ at the opposite ends of the stack being maintained in contact with respective current collectors.

It is to be understood that while preferred embodiments have been shown and described, the invention is in no way limited to the said embodiments which have been presented only by way of examples. More particularly, without departing from the scope of the invention as defined in the appended claims, details may be modified, certain arrangements may be changed, or certain means may be replaced by equivalent means. There is no intention of limitation to the details described.

What is claimed is:

1. An electric cell of high discharge rate type comprising a metallic casing, current collectors, an assembly or positive and negative electrodes and separator means, each electrode comprising a metallic carrier and active material borne therein and each carrier having a bare edge part of selected width, the bare edge part of the positive electrode projecting outwardly of one end of said assembly and the bare edge part of the negative electrode prejecting outwardly of the opposite end of said assembly, slots in said edge parts dividing them into segments, said segments of each carrier being turned down at the respective ends of the assembly into overlapping fish scale-like manner, each segment being dimensioned to span a length greater than twice the space separating two adjacent electrode portions of the polarity and also to overlap laterally and adjoining segment, thus serving to define and form substantially plane elastically deformable areal surfaces at opposite ends of the assembly, each substantially perpendicular to the assembly axis, one of said current collectors being in intimate surface contact with the areal fish scale-like surface at one end of said assembly to constitute a current collector at said last-named end, another of said current collectors at the opposite end of said assembly being in intimate surface contact with the areal fish scale-like surface at said opposite end and in electrical contact with said casing and means to maintain said intimate surface contacts.

2. An electric cell of high discharge rate type according to claim 1 wherein said current collectors are welded respectively to the respective areal fish-scale-like surfaces at opposite ends of said assembly.

3. An electric cell of high discharge rate type according to claim 1, wherein said current collectors are maintained unde pressure against the respective areal fish scale-like surfaces with which they are in intimate surface contact.

4. An electric cell of high discharge rate type according to claim 1 including means for securing one of said current collectors in place and in insulating relationship to said casing.

5. An electric cell of high discharge rate type according to claim 4 wherein said one of said current collectors constitutes a cover for said casing crimped to an edge of said casing.

6. An electric cell of high discharge rate type according to claim 1, wherein said another current collector is a metallic cambered member positioned between the bottom of said casing and the adjoining areal fish scale-like surface of said assembly and in intimate electrical contact with said bottom and said last-named surface.

7. An electric cell of high discharge rate type according to claim 1 wherein one of said current collectors comprises the bottom of said casing.

8. An electric cell of high discharge rate type according to claim 1 wherein said separator means have portions projecting outwardly at opposite ends of said assembly, said portions being turned down and inserted in part between folded-over segments.

9. A battery of like electric cells according to claim 1, wherein said cells are disposed in a stack end to end with adjacent areal fish scale-like surfaces of opposite polarity in electric contact and said current collectors being disposed respectively in intimate contact with respective outermost areal fish scale-like surfaces of the stack, said casing containing the entire stack.

10. A battery of like electric cells according to claim 1, wherein said cells are disposed side-by-side with adjacent areal fish scale-like surfaces of like polarity all similarly disposed, said current collectors being disposed respectively in intimate contact with all like polarity areal fish scale-like surfaces and said casing containing all of said cells.

References Cited

UNITED STATES PATENTS

| 3,347,709 | 10/1967 | Taylor et al. | 136—108 |
| 3,393,095 | 7/1968 | Philipp | 236—14 |
| 3,503,806 | 3/1970 | Sugalski | 136—13 |

FOREIGN PATENTS

| 1,415,519 | 9/1965 | France | 136—13 |

ANTHONY SKAPARS, Primary Examiner

U.S. Cl. X.R.

136—134

PO-1050
(5/69)

UNITED STATES PATENT OFFICE
CERTIFICATE OF CORRECTION

Patent No. 3,761,314          Dated Sept. 25, 1973

Inventor(s) Jean-Pierre Cailley

It is certified that error appears in the above-identified patent and that said Letters Patent are hereby corrected as shown below:

In the preamble "Romanville" should read ---Romainville---;

Column 1, line 27, "laternally" should read ---laterally---.

Column 3, line 36 "for insubstantially" should read ---form substantially---.

Column 3, line 42, correct the spelling of "reference".

Column 3, line 53, correct the spelling of "metal".

Column 5, line 9, correct the spelling of "crimping".

Column 5, line 55, change "prejecting" to ---projecting---.

Column 5, line 61, change "the" to ---like---;

line 62, "and" should read --an---.

Column 6, line 14, change "unde" to --under---.

Signed and sealed this 5th day of February 1974.

(SEAL)
Attest:

EDWARD M. FLETCHER, JR.          RENE D. TEGTMEYER
Attesting Officer                Acting Commissioner of Patents